United States Patent [19]

Etter

[11] 3,838,819

[45] Oct. 1, 1974

[54] TIP FOR AN INDUSTRIAL GAS CUTTING TORCH

[76] Inventor: Berwyn E. Etter, 10355 Paradise Blvd., Treasure Island, Fla. 33740

[22] Filed: June 15, 1972

[21] Appl. No.: 263,268

[52] U.S. Cl. .............................................. 239/424.5
[51] Int. Cl. ............................................... B05b 7/06
[58] Field of Search ...................... 239/423, 424.5

[56] References Cited
UNITED STATES PATENTS

| 909,190 | 1/1909 | Keller | 239/423 |
|---|---|---|---|
| 1,485,715 | 3/1924 | Robinson | 239/423 |
| 2,519,939 | 8/1950 | Smith | 239/424.5 |
| 2,737,419 | 3/1956 | Marcuse | 239/424 |
| 2,881,826 | 4/1959 | Spies, Jr. | 239/424.5 |
| 3,053,312 | 9/1962 | Villoresi | 239/424.5 |
| 3,351,284 | 11/1967 | Hutton et al. | 239/424 |
| 3,510,064 | 5/1970 | Crook et al. | 239/424.5 |
| 3,575,354 | 4/1971 | Hach, Jr. | 239/424.5 |

*Primary Examiner*—Lloyd L. King
*Attorney, Agent, or Firm*—Zarley, McKee & Thomte

[57] ABSTRACT

A tip for an industrial gas cutting torch is disclosed comprising an elongated hollow shell element having a cone element mounted therein. The lower end of the cone element terminates inside and adjacent the lower end of the hollow shell. The lower ends of the shell element and the cone element dwell in an oblique plane with respect to the longitudinal axis of the shell element to faciliate the making of a bevel cut on a sheet of material. The method of using the tip is also disclosed.

6 Claims, 4 Drawing Figures

PATENTED OCT 1 1974
3,838,819
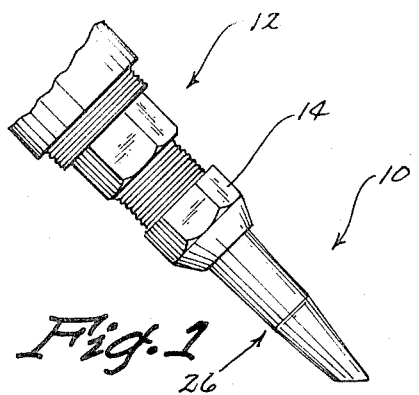
Fig. 1
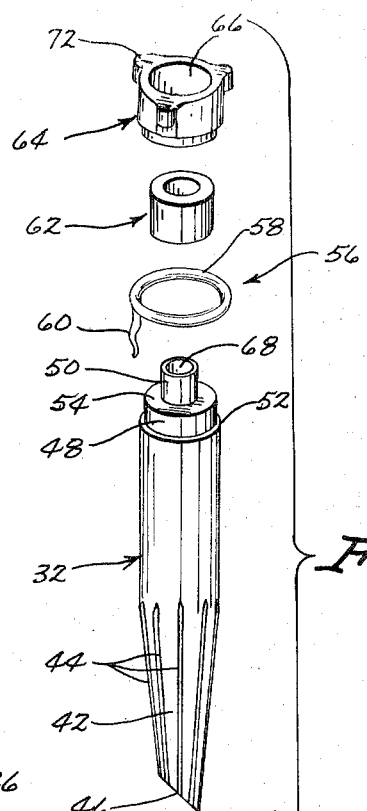
Fig. 2
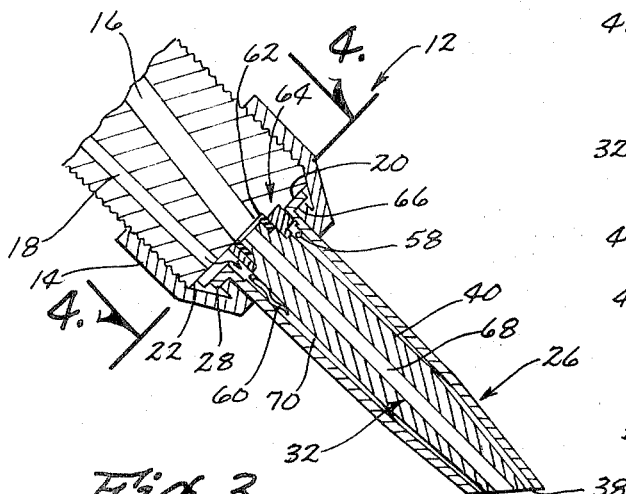
Fig. 3
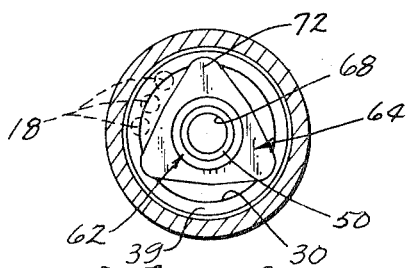
Fig. 4
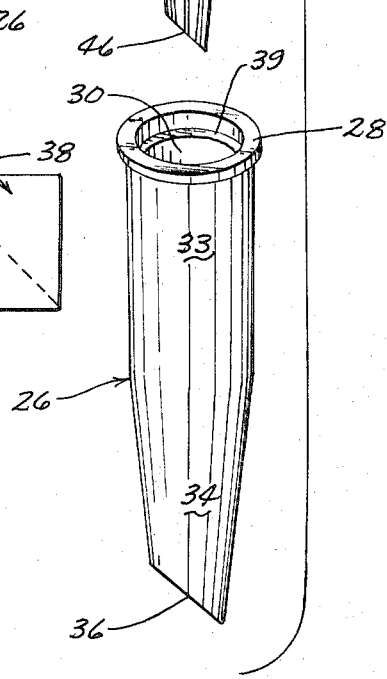

TIP FOR AN INDUSTRIAL GAS CUTTING TORCH

Conventional tips for cutting torches ordinarily taper from their base end to the tip end thereof. The flame at the tip end is disposed generally parallel to the longitudinal axis of the body of the tip. If a bevel is to be cut in a sheet or plate, the tip is ordinarily maintained in an inclined relationship with respect to the sheet so that the flame is disposed at the angle of the desired bevel. In such an attitude, the flame tends to bounce off the sheet which substantially reduces the efficiency of the cutting action.

Therefore, it is a principal object of this invention to provide an improved tip for an industrial gas cutting torch.

A further object of this invention is to provide a tip for an industrial gas cutting torch which is designed so as to form a bevel in the material being cut.

A further object of this invention is to provide a tip for an industrial gas cutting torch which is efficient.

A further object of this invention is to provide a tip for an indusrial gas cutting torch having means thereon for retaining the inner cone element in the outer shell element.

A further object of this invention is to provide a tip for an industrial gas cutting torch wherein the lower ends of the inner cone element and the outer shell element dwell in a plane which is oblique to the longitudinal axis of the cone and shell elements.

A further object of this invention is to provide a tip for an industrial gas cutting torch which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the tip as it would be disposed when forming a bevel in a sheet member;

FIG. 2 is an exploded perspective view of the tip of this invention:

FIG. 3 is a longitudinal sectional view of the tip; and

FIG. 4 is a sectional view seen along lines 4—4 of FIG. 3.

The tip of this invention is referred to generally by the reference numeral 10 while the numeral 12 refers to the head portion of a conventional cutting torch. Tip 10 is maintained on the head 12 by nut 14. Head 12 has a bore 16 formed therein which would be in communication with a source of oxygen. A plurality of bores 18 are formed in head 12 and would be in communication with a source of an oxygen and industrial gas mixture. As seen in FIG. 3, head 12 has a lower end 20 with a recess 22 formed therein. Recess 22 is in communication with the bore 16 and the bores 18.

Tip 10 comprises an elongated hollow shell element 26 including an outwardly extending flange 28 at the upper end thereof. Bore 30 extends through the shell element 26 for receiving the cone element 32 therein as will be explained in more detail hereinafter. In general, shell element 26 includes an upper body portion 33 and a lower body portion 34 which tapers inwardly with respect to the upper body portion 33. The lower end 36 of the shell element 34 dwells in a plane which is oblique to the longitudinal axis of the shell element 26 as illustrated in FIG. 3. Opening 38 is formed in the lower end 36 as also seen in FIG. 3. Shell element 26 is provided with a shoulder 39 in its upper end (FIG. 2).

Cone element 32 includes an upper body portion 40 and a lower body portion 42 which tapers inwardly from the lower end of upper body portion 40 as viewed in FIG. 2. A plurality of elongated grooves 44 are formed in the lower body portion of the cone element 32 and extend to the lower end 46 of the cone element 32. As seen in FIG. 3, the lower end of cone element 32 dwells in a plane which is oblique to the longitudinal axis of the cone element 32. The lower ends of the elements 26 and 32 are parallel. Cone element 42 is provided with reduced diameter portions 48 and 50 at its upper end defined by shoulders 52 and 54.

The numeral 56 refers to a retainer including a ring portion 58 which is adapted to embrace upper body portion 33 of shell element 26 as seen in FIG. 3. A spring clip 60 extends downwardly from ringe portion 58 and is adapted to yieldably engage the interior surface of the shell element 26 to maintain the cone element 32 therein where the tip 10 is removed from the torch. Seal 62 embraces reduced diameter portion 50. Disc 64 embraces seal 62 and reduced diameter portion 48.

Assuming that the cone element 32 is inserted into the shell element 26, the tip is secured to the head 12 by simply extending the shell element 26 through the opening formed in the nut 14 until the flange 28 engages the annular shoulder 66 in the nut 14. The upper end of disc 64 is generally triangular in shape as seen in FIG. 4. Disc 64 has a central opening 66 which receives the seal 62 and reduced diameter portion 48. The nut 14 is then threadably secured to head 12 as illustrated in FIG. 3. Tightening of the nut 14 draws the seal 62 into sealing engagement with the head 12 around the bore 16 to prevent escape of oxygen as it passes from bore 16 to the bore 68 in cone element 32. Tightening of the nut 14 also causes the disc 64 to engage the recess 32 of the head 12 as seen in FIG. 3. FIG. 3 depicts the fact that the outside diameter of the upper body portion 40 of cone element 32 is slightly less than the inside diameter of the upper body portion 33 of the shell element 26 so as to define a chamber or compartment area 70 therebetween. Bores 18 communicate with the area 70 between the lobes 72 of the disc 64. The exterior surface of lower body portion 42 of cone element 32 engages the inner surface of lower body portion 34 of shell element 26. The grooves 44 permit the flow of the oxygenindustrial gas flow therebetween.

In operation, the tip 10 would be oriented with respect to the plate or sheet material 74 as viewed in FIG. 1. The tip 10 could either be mounted on a hand cutting torch or a machine mounted cutting torch as desired. If a bevel is to be formed in the member 74, the tip 10 is oriented so that the longitudinal axis thereof is disposed in the direction of the bevel cut and so that the lower end of the tip is in a plane parallel to the flat surface of the member to be cut. The lower ends of the shell element 26 and the cone element 32 dwell in an oblique plane with respect to the longitudinal axis of the tip to facilitate the making of a bevel cut in the member 74. The oxygen and gas mixture is supplied to the end of the tip by way of bores 18, between the lobes 72 of disc 64, compartment area 70 and grooves 44. Cutting oxygen is furnished to the end of the tip through the bore 16 and bore 68. Thus, the cutting oxygen is supplied to the center of the tip with the oxygen-gas mixture being supplied around the periphery of the lower end of the bore 68. The valve means for supplying the oxygen and gas to the tip 10 has not been shown but is conventional in nature.

The tip 10 performs the bevel cutting action much more efficiently than the prior conventional devices. It has been found that a bevel cut can be formed in a 1 inch steel plate at the rate of approximately 14 inches per minute as compared to the 8 inches to 9 inches per minute heretofore possible with existing tips. The tip 10 results in an approximate 30 to 40 percent increase in cutting efficiency due to the relationship of the longitudinal axis thereof with respect to the surface being cut and due to the fact that the lower end of the tip dwells in a plane parallel to the surface of the member being cut.

While the tip 10 has been described as comprising a shell element 26 and a cone element 32, it should be understood that the tip 10 could be formed from a single member. When shell element 26 and cone element 32 are employed, the retainer 56 prevents their inadvertent separation when the tip 10 is removed from the torch.

Thus it can be seen that an improved tip has been provided for an industrial gas cutting torch.

I claim:

1. In a tip for an industrial gas cutting torch, an elongated tubular-like cutting tip means having upper and lower ends and a longitudinal axis, the lower end of said tip element dwelling in an oblique plane with respect to said longitudinal axis, and means for maintaining the lower end of said cutting tip means in a plane parallel to a sheet of material to facilitate the making of a bevel cut therein.

2. The device of claim 1 wherein said cutting tip means comprises a hollow shell element having a longitudinal axis and a cone element in said shell element having a longitudinal axis.

3. The device of claim 2 wherein the lower ends of said hollow shell element and said cone element dwell in the same plane.

4. The device of claim 3 wherein the lower end of said cone element terminates inside and adjacent the lower end of said hollow shell element.

5. The device of claim 2 wherein a retainer means embraces said cone element and yieldably engages said hollow shell element to yieldably prevent the separation of said cone element and said shell element when said cone element and said shell element are removed from the torch.

6. In combination, a cutting tip means for a cutting torch comprising a hollow shell element and a cone element in said shell element, and retainer means yieldably maintaining said cone element in said shell element when said shell element and said cone element are removed from the cutting torch comprising a ring embracing said cone element and a spring clip means extending therefrom which yieldably engages the inner surface of said shell element.

* * * * *